3,509,794

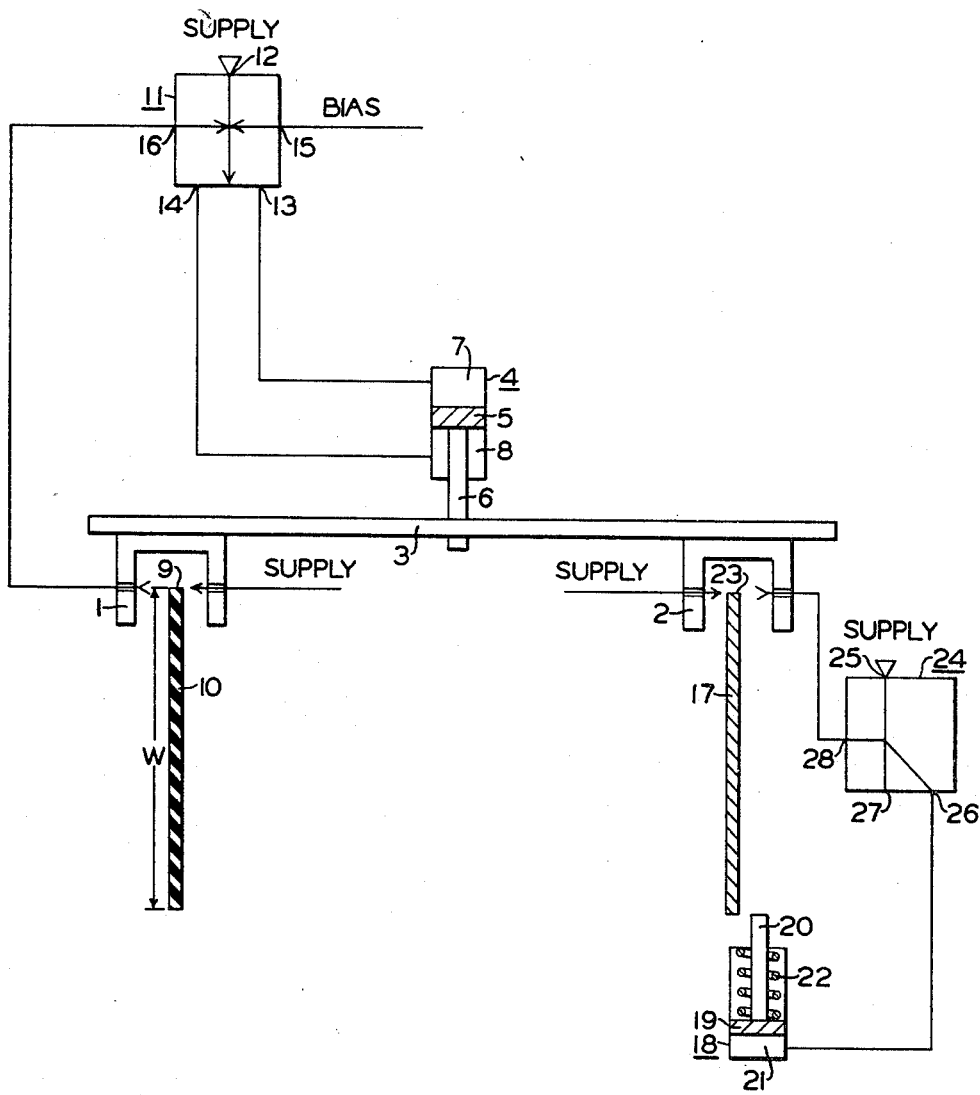

APPARATUS FOR SENSING THE POSITION OF A MASTER OBJECT AND CONTROLLING THE POSITION OF ANOTHER OBJECT RELATIVE THERETO

Clifford W. Allen, Richard F. Wilson, and Michael D. Lyons, Lexington, Ky., assignors to Westinghouse Air Brake Company, Wilmerding, Pa., a corporation of Pennsylvania
Filed Feb. 21, 1968, Ser. No. 707,038
Int. Cl. F15b 9/06; B65h 25/08
U.S. Cl. 91—3          7 Claims

ABSTRACT OF THE DISCLOSURE

Apparatus for sensing the position of a master object and controlling the position of another object relative thereto, in which, a proportional fluid amplifier controlled by a first interruptible jet sensor controls a cylinder to position the sensing gap of the first jet sensor at an edge of a master object, and an OR-NOR fluidic amplifier controlled by a second interruptible jet sensor movable with the first interruptible jet sensor controls a second cylinder for maintaining the position of an edge of a second object in the sensing gap of the second interruptible jet sensor whereby the edge of the second object is maintained in a predetermined relationship relative to the edge of the master object.

BACKGROUND OF THE INVENTION

Heretofore, in apparatus for sensing the position of a master object and controlling the position of a slave object relative to the master object, the sensing devices comprised photocells or limit switches in electrical position control circuits, which devices limited the utility of the apparatus to objects comprised of certain materials. The operation of the photocell sensor was satisfactory only when sensing opaque non-porous materials. The operation of the limit switch sensor was satisfactory only when sensing materials having a weight sufficient to inhibit the sensor itself from displacing the material to be sensed.

SUMMARY OF THE INVENTION

It is the object of the present invention to provide in an apparatus for sensing the position of a master object and controlling the position of another object relative thereto, interruptible jet means for sensing the position of objects comprised of a wide variety of materials, which interruptible jet sensor means are control components of fluidic positioning systems having relatively few moving parts.

In the present invention this object is achieved by disposing on a mounting means a pair of spaced aligned interruptible jet sensors, the mounting means being movable in a direction perpendicular to the axis of alignment of the jets by a first fluid pressure operated cylinder device controlled by a load sensitive proportional fluidic amplifier having its two outputs operable to pressurize the cylinder on opposite sides of the piston. One of the interruptible jet sensors provides a control pressure to the proportional fluidic amplifier in overriding opposition to a bias control pressure to provide a predominant pressure on one side of the first cylinder to move the one jet sensor toward the edge of a master object, whereupon interruption sensing gap of the one jet sensor by such edge reduces the control input pressure to the proportional fluidic amplifier to equalize pressure on opposite sides of the piston, thus disposing the first jet sensor at the edge of the master object. If the master object should completely interrupt the sensing gap of first jet sensor thereby eliminating the control input, the other end of the cylinder is pressurized by the bias input to move the mounting means and the first jet sensor in the opposite direction until the first jet sensor again provides a control input to the proportional fluidic amplifier equalling the bias to thereby dispose the first jet sensor at the edge of the master object. The second interruptible jet sensor provides a control pressure to an OR-NOR fluidic amplifier which pressurizes the OR output to operate a spring-return cylinder for guiding a second object toward the second interruptible jet sensor until the edge of the second object interrupts the second jet to reduce the control pressure until the OR-NOR fluidic amplifier switches output pressure to the NOR output thereby relieving pressure on the spring-return cylinder which operates via spring return to control withdrawal of the second object from the sensing gap of the second jet, thereby increasing the control pressure to the OR-NOR fluidic amplifier to again switch control pressure to the OR output.

This and other objects of the invention will become more readily apparent in the following description, taken with the single drawing figure comprising a diagrammatical view of the invention.

Referring now to the drawing, it will be seen that a pair of conventional interruptible jet sensors 1 and 2 are fixedly disposed in spaced aligned relationship on a mounting means 3, such as a beam. In order to move the interruptible jet sensors simultaneously in a direction perpendicular to their alignment, there is provided a fluid pressure operated cylinder device 4 including therein a reciprocable piston 5 carrying a piston rod 6 having the distal end thereof extending through the end wall of the cylinder and attached to the mounting means 3. The piston 5 divides the interior of the cylinder 4 into two pressure chambers 7 and 8 so that in response to a preponderance of pressure in pressure chamber 7 the piston rod 6 is extended to move interruptible jet sensor 1 toward the edge 9 of a master object 10, and conversely, in response to a preponderance of pressure in pressure chamber 8 the piston rod is retracted to move interruptible jet sensor 1 away from the aforementioned edge 9 of master object 10.

In order to provide a preponderance of pressure in either of pressure chambers 7 and 8 relative to the other so that the piston rod 6 is extended or retracted, respectively, so as to adjust the position of interruptible jet sensor 1 to follow the edge 9 of the master object 10, there is provided a proportional fluidic amplifier 11, of any commercially available type, having a supply port 12 for communication with a source of fluid pressure supply, not shown, a first output port 13 communicating with pressure chamber 7 in cylinder 4, a second output port 14 communicating with pressure chamber 8 in cylinder 4, a first control pressure input port 15 for communication with a predetermined bias fluid pressure source, not shown, which bias is at a pressure less than supply pressure, and a second pressure control input port 16 communicated with the source of supply, not shown, by way of interruptible jet sensor 1.

In order to control movement of a second object 17 toward or away from the second interruptible jet sensor 2, there is provided a spring-return cylinder device 18 having a piston 19 reciprocably disposed therein, a piston rod 20 attached to the piston and extending through one end wall of the cylinder, a fluid pressure chamber 21 on one side of the piston, which, when pressurized, effects extension of the piston rod, and a spring 22 disposed between the other side of the piston and the end wall to effect retraction of the piston rod upon depressurization of the pressure chamber 21. The piston rod 20, shown displaced from object 17, may be attached directly to the second object 17 in some applications of the invention, or as in the specific application of the invention hereinafter described in detail, may control an intermediate object positioning device, not shown, such as guide rollers on a conveyer belt, not shown.

In order to effect pressurization or depressurization of pressure chamber 21 in spring-return cylinder 18 so as to position the edge 23 of object 17 to follow interruptible jet sensor 2, there is provided an OR-NOR fluidic amplifier 24, which may be of any commercially available type, having a supply port 25 for communication with a source of supply, not shown, an OR gate or output port 26 communicating with pressure chamber 21 in spring-return cylinder 18, a vented NOR gate or output port 27, and a control pressure input port 28 communicated with a source of supply, not shown, by way of interruptible jet 2.

In now describing one application of the above-described invention, it will be assumed that master object 10 comprises a sheet of material of indefinite length having a width W, and a linear or substantially linear longitudinally extending edge 9, which master object is disposed on a conveyer belt, not shown, with the width dimension W disposed horizontally relative to gravity and transversely relative to the conveyer belt so that movement of the master object with the belt is in the lengthwise direction of the material. It will also be assumed that slave object 17 is of the same or different material having substantially the same dimensions as that of material 10 and is similarly disposed on another conveyer belt, not shown, in vertical disposition relative to master object 10 and moving at the same speed and in the same direction as master object 10, the object of such relative disposition of the two materials is to bring the two objects 10 and 17 vertically together at the end of the conveyer belts with the edge 9 of master object 10, and edge 23 of slave object 17 in vertical coincidence in preparation for the next operation, for example, where master object 10 is a rubber base material and slave object 17 is an open weave cloth material, such as cheese cloth, which are to be brought together for passing into a vulcanization chamber as part of a rug making process.

The present invention may be utilized in the manner now to be described to maintain edges 9 and 23 of the master object 10 and slave object 17, respectively, in vertical alignment to effect vertical coincidence of the two edges at the end of the conveyer belts.

If it is now assumed that the edge 9 of moving master object 10 is displaced from the sensing gap of interruptible jet sensor 1 so that full control pressure is provided via interruptable jet sensor 1 at control input port 16 of proportional fluidic amplifier 11, such pressure overrides bias pressure at input port 15 thereby effecting a proportionately larger output pressure at output 13 relative to output 14 producing a preponderance of pressure in pressure chamber 7 relative to pressure chamber 8, thereby extending piston rod 6 and moving the sensing gap of interruptible jet sensor 1 toward edge 9 of master object 10. As edge 9 progressively interrupts interruptible jet sensor 1, thus progressively reducing control pressure at control input 16, such control pressure will reduce until equal to the bias pressure at control input 15, thus equalizing the pressure in pressure chambers 7 and 8 to stop movement of piston 5 and hold the sensing gap of interruptible jet sensor 1 at edge 9. If the moving edge 9 is not linear or if the longitudinal axis of master object 10 is not fully colinear with the belt, edge 9 may further interrupt interruptible jet sensor 1 to further reduce pressure at input 16, in which event the bias pressure will exceed the control pressure at 16 to provide a proportionally larger pressure in chamber 8 relative to chamber 7, this effecting retraction of piston rod 6 to move interruptible jet sensor 1 away from master object 10 until edge 9 again interrupts jet sensor 1 by an amount effecting an equalized pressure in chambers 7 and 8 in the manner above described. In this manner, interruptible jet sensor 1 follows the lateral movement of moving edge 9 of master object 10 across the sensing gap. Although the above-described operation may effect a small hunting action of the interruptible sensor jet 1 relative to edge 9, this slight vibratory action is relatively insignificant and within the allowable tolerances.

Since interruptible jet sensor 2 is fixed relative to interruptible jet sensor 1, any of the above-described movements of the latter effects simultaneous identical movement of the former. Therefore, assuming, now that interruptible jet sensor 1 has effected operation of proportional amplifier 11 to provide a preponderance of pressure in chamber 8 to retract piston rod 6, interruptible jet sensor 2 accordingly will move away from edge 23 of slave object 17 thereby providing full supply pressure to control port 28 of OR-NOR fluidic amplifier 24 which thereupon operates to switch pressure from vented NOR port 27 to OR output port 26 and to pressure chamber 21 of spring-return cylinder 18, causing an extension of piston rod 20 to actuate conventional guide rollers, not shown, on the conveyer belt, not shown, to move edge 23 of slave object 17 into the sensing gap of interruptible jet sensor 2. Upon interruption of jet sensor 2, input pressure to control port 28 is reduced, causing OR-NOR fluidic amplifier to switch output pressure from OR port 26 to vented NOR port 27, thus reducing the pressure in chamber 21 of the spring-return cylinder 18, whereupon return spring 22 retracts piston rod 20. The inherent spring-return mechanism in the conventional guide rollers moves slave object 17 out of the sensing gap until the fluid flow across the sensing gap of interrupted jet sensor 2 is reestablished, thus switching OR-NOR fluidic amplifier to the first condition above described to operate cylinder 18 to again move the edge 23 of the slave object 17 into the sensing gap of jet sensor 2. The small vibratory hunting action of edge 23 for the interruptible jet sensor 2 is relatively insignificant and within allowable tolerance of deviation of edge 23 relative to coincidence with edge 9 of the master object 10.

Having now described the invention, what we claim as new and desire to secure by Letters Patent is:

1. Apparatus for sensing the position of a master object and controlling the position of another object relative thereto, comprising:
   (a) a first interruptible fluid jet sensor device having a sensing gap;
   (b) means including cylinder means for moving said sensing gap of said first interruptible jet sensor device to and from an edge of a master object;
   (c) first fluidic amplifier means responsive to the state of interruption of said interruptible fluid jet sensor device by said edge to control said cylinder means to position said sensing gap of said interruptible jet at said edge of said master object;
   (d) a second interruptible fluid jet sensor device having a sensing gap and fixed to and movable with said first interruptible fluid jet sensor device;
   (e) second cylinder means for controlling the movement of an edge of another object to and from said sensing gap of said second interruptible jet sensor device; and
   (f) second fluidic amplifier means responsive to the state of interruption of the sensing gap of said second interruptible fluid jet sensor device by said edge of said another object to control said second cylinder means to position said edge of said another object at said sensing gap of said second interruptible fluid jet sensor device.

2. Apparatus for sensing the position of a master object and controlling the position of another object relative thereto, as recited in claim 1, in which said first fluidic amplifier means comprises a proportional amplifier having one control input communicating with the output of said first interruptible fluid jet sensor device, a second control input for communication with a bias pressure less than the full output pressure of said first interruptible fluid jet sensor device, and a pair of outputs communicating with opposite ends of said cylinder means.

3. Apparatus for sensing the position of a master object and controlling the position of another object relative thereto, as recited in claim 1, in which:
 (a) said second cylinder means comprises a spring-return cylinder; and
 (b) said second fluidic amplifier means comprises an OR-NOR fluidic amplifier having one of two outputs communicating with said spring-return cylinder to provide pressure opposing the spring-return force, the other of said two outputs being vented to atmosphere, and a control input communicating with the output of said second interruptible fluid jet sensor device.

4. Apparatus for sensing the position of a master object and controlling the position of another object relative thereto, comprising:
 (a) a first interruptible fluid jet sensor device having a sensing gap;
 (b) means including cylinder means for moving said sensing gap of said first interruptible jet sensor device to and from an edge of a master object;
 (c) a first fluidic amplifier having one control input communicating with the output of said first interruptible fluid jet sensor device, a second control input for communication with a bias pressure less than the full output pressure of said first interruptible fluid jet sensor device, and a pair of outputs communicating with opposite ends of said cylinder means;
 (d) a second interruptible fluid jet sensor device fixed to and movable with said first interruptible fluid jet sensor device;
 (e) second cylinder means comprising a spring-return cylinder for controlling the movement of an edge of another object into and out of said sensing gap of said second interruptible fluid jet sensor device;
 (f) second fluidic amplifier means comprising an OR-NOR fluidic amplifier having one output communicating with said spring-return cylinder to provide pressure opposing the spring-return force; the other of said outputs being vented to atmosphere, and a control input communicating with the output of said second interruptible fluid jet sensor device.

5. Apparatus for sensing the position of an edge of an object, comprising:
 (a) an interruptible fluid jet sensor device having a sensing gap;
 (b) means including cylinder means for moving said sensing gap of said interruptible fluid jet sensor device to and from said edge of said object; and
 (c) a fluidic proportional amplifier device having one control input communicating with the output of said interruptible fluid jet sensor device, a second control input for communication with a bias pressure less than the full output pressure of said interruptible fluid jet sensor device, and a pair of outputs communicating with opposite ends of said cylinder means.

6. Apparatus for positioning an object relative to an object sensing device, comprising:
 (a) an object sensing device comprising an interruptible fluid jet sensor device having a sensing gap;
 (b) a spring-return cylinder means operable to control movement of an edge of an object into and out of said sensing gap of said interruptible fluid jet sensor device; and
 (c) fluidic amplifier means operable in response to the state of interruption of said sensing gap of said interruptible fluid jet sensor device by said object to control the operation of said spring-return cylinder, means to position said edge of said object at said sensing gap of said interruptible fluid jet sensor device.

7. Apparatus for positioning an object relative to an object sensing device, as recited in claim 6, in which: said fluidic amplifier means comprises an OR-NOR fluidic amplifier having one of two outputs communicating with said spring-return cylinder means to provide pressure opposing the spring-return force, the other of said two outputs being vented to atmosphere, and a control input communicating with the output of said interruptible fluid jet device.

References Cited

UNITED STATES PATENTS

| 2,641,416 | 6/1953 | McCleary et al. | 242—57.1 |
| 2,735,630 | 2/1956 | Ziebolz | 242—57.1 |
| 3,317,101 | 5/1967 | Himrod et al. | 226—19 |

EDGAR W. GEOGHEGAN, Primary Examiner

U.S. Cl. X.R.

226—19; 242—57.1